3,803,108
POLYVINYLIDENE FLUORIDE POWDER
Luke Ralph Ocone, Philadelphia, Pa., assignor to
Pennwalt Corporation, Philadelphia, Pa.
No Drawing. Filed June 12, 1972, Ser. No. 261,837
Int. Cl. C08f 3/22, 15/24
U.S. Cl. 260—87.7                                    3 Claims

ABSTRACT OF THE DISCLOSURE

Polyvinylidene fluoride resin powder having improved properties in coating compositions is prepared by freeze drying aqueous PVDF latex solids.

---

This invention concerns a process for preparing a powdery polyvinylidene fluoride resin having improved properties in the formulation of coating compositions. More particularly, this invention pertains to a process for obtaining polyvinylidene fluoride resin powder having improved characteristics in coatings formulations by subjecting aqueous vinylidene fluoride polymer latex resin solids to freeze drying to separate the water from the resin by sublimation.

It is well known how to prepare a latex (i.e., a colloidal dispersion) of vinylidene fluoride polymer by the emulsion polymerization of the monomer in aqueous medium containing emulsifying agent (surfactant), initiated by a free-radical catalyst, and in admixture with various other modifying ingredients if so desired. Typical procedures for preparing aqueous dispersions of vinylidene fluoride polymer are set forth, for example in U.S. Pats. 3,012,021; 3,031,437; 3,193,539; and 3,475,396. (The terms "polyvinylidene fluoride," "PVDF," "vinylidene fluoride polymer" and "polyvinylidene fluoride resin" used herein mean both the normally solid high molecular weight vinylidene fluoride homopolymers and the normally solid high molecular weight copolymers thereof containing a predominance of vinylidene fluoride units, for example, copolymers of vinylidene fluoride with up to about 30 mole percent of such comonomers as hexafluoropropene, 1-chloro-1-fluoroethylene, trifluorochloroethylene, trifluoroethylene, tetrafluoroethylene, and others, such copolymers having physical properties essentially the same as the homopolymer with regard to coating techniques). The PVDF latexes so prepared are aqueous dispersions of vinylidene fluoride polymer wherein the polymer solids comprise from about 5 to about 60 weight percent of the composition.

In conventional prior art procedures the colloidally dispersed polymer is recovered from the aqueous medium by inducing coagulation of the latex, separating the coagulum from the aqueous medium by decantation or filtration, or both, and drying the coagulum to yield the polyvinylidene fluoride powder, such as by air drying, or usually by air-oven drying at temperatures within the range of about 20° C. to about 150° C. (A variety of methods are known to coagulate the PVDF latex to facilitate the separation of the polymer from the aqueous medium for easier drying, for example, high- and low-shear mechanical agitation of the latex, freezing the latex, i.e., "freeze-coagulation," addition of electrolytes or solvents to the latex, and aeration of the latex with an inert gas.)

It is well known in the art to prepare high-performance coating compositions by dispersing vinylidene fluoride polymer powder (prepared from emulsion systems as described above) in organic solvent media, as discussed in detail, for example, in U.S. Pats. 3,441,531; 3,324,069; 3,340,222 and 3,470,014. The particles of the polymer in the final solvent dispersions must be quite small if a smooth texture of coating is to be obtained. Coatings made from dispersions containing large fractions of particles with diameters over 25 microns have a grainy appearance. In general, the smoothness of the mixtures and of coatings made therefrom will be inversely proportional to the amount of large-diameter particles in the dispersion, and even particles smaller than 25 microns may impart some graininess.

In practice, the preparation of smooth dispersions of PVDF in the solvent carrier has been quite difficult. Various high-energy grinders such as ball and pebble mills, sand mills and Szegvari attritors, and three-roll mills are used for this purpose. These are costly operations in terms of equipment and time, and polymers which can be dispersed to an acceptable fineness or smoothness economically by simple equipment such as high speed stirrers (e.g., the "Cowles Impeller") are therefore desired for practical reasons.

Although the vinylidene fluoride polymer synthesized as described above is initially produced in a finely-divided, small-particle size state, recovery of the polymer powder by conventional drying operations causes primary particle agglomeration. For example, the polymer particles in latexes made by emulsion polymerization can be uniformly small (diameters on the order of 0.1 to 1 micron). However, when these polymers are recovered from the aqueous dispersions by the usual coagulation and drying procedures, large agglomerates are formed from the primary latex particles. Extensive milling and grinding is required to prepare satisfactory solvent dispersions from such polymer powders.

It has now been discovered, in accordance with the present invention, that polyvinylidene fluoride resin powder that has been recovered by freeze drying the aqueous latex solids is markedly superior to conventionally dried products in the preparation of coatings dispersions. By "freeze drying" is meant the technique of removing water from a frozen mixture containing the polymer particles by the process of sublimation. This can be done conveniently in a high vacuum, although sublimation of the water in the presence of a gas is also operable.

In the embodiments of this invention, good results are obtained by either freeze drying the total aqueous polymer latex, that is, without prior coagulation and separation, or by freeze-drying the wet coagula obtained by conventional latex coagulation techniques as described earlier. The freeze drying of the resin solids is carried out so as to yield a substantially dry polymer powder containing on the order of about 0.1 weight percent moisture or less, although greater amounts of moisture may be left in the resin without adverse results.

As aforementioned, the freeze drying operation embodied herein may be performed on the total (uncoagulated) PVDF latex or, in the preferred embodiment, on the wet coagula of said latex. In accordance with conventional and preferred freeze drying techniques, the aforesaid polymer-water mixture is frozen (e.g. to from about −196° C. to 0° C.) and then subjected to heat under suitable vacuum to effect separation of the water from the resin by sublimation. Reduced pressures on the order of $10^{-6}$ to 4 mm. Hg abs. may be employed; generally, the higher vacuums are preferred, i.e., pressures in the range of $10^{-6}$ to 0.5 mm. Hg abs. The transition from solid water to gaseous water (sublimation) is endothermic, and energy must be supplied to effect the transition. As long as the chamber is maintained at a pressure lower than the vapor pressure of the frozen water, sublimation will cool the sample and prevent melting of the ice. Vacuum freeze drying equipment suitably adapted for use herein is commercially available for either batch or continuous operations. As an alternative to reduced pressure operations, the freeze drying may be accomplished by sublimation of the water in the presence of an inert gas, i.e., by passage of a cold dry gas such as nitrogen, oxygen, air, helium, etc. over the coagulum to remove water vapor in equilibrium with the ice, thereby removing the moisture from the resin by sublimation.

It has been discovered that, as an advantage of the present invention, recovery agglomeration of vinylidene fluoride polymer particles produced from aqueous dispersions is minimized by removal of the water by freeze drying. (This effect is confirmed by the data given in the examples below). Surprisingly, although the average particle diameters of powders prepared by freeze drying are only slightly smaller than those of powders prepared by warm-air drying of coagula, the freeze-dried powders have a much lower content of large particles. Stated another way, polymer powders prepared by freeze drying have a narrower particle-size distribution. This characteristic makes these freeze-dried powders especially advantageous for solvent dispersions formulations for coatings applications. It has been found that dry PVDF powders recovered from aqueous emulsions by freeze drying can be dispersed into solvent carriers more easily than can powders recovered by the usual coagulation procedures followed by warm-air drying. Freeze-dried polymer powders give a finer grind (smoother dispersion) under given grinding conditions, and these differences are more pronounced when a mild grinding technique is used. An accepted method of determining the fineness of grind is ASTM Test Method D1210-54 which gives ratings of 0-8 on the so-called Hegman scale. Products recovered from aqueous dispersions by freeze drying consistently give higher Hegman values (better grinds) than products produced by warm-air drying of coagula.

The vinylidene fluoride polymer powders prepared by freeze drying are also useful and preferred in other applications such as powder coatings. Two major techniques used for powder coating are fluidized beds and electrostatic spraying. Particle size is critical in both procedures. The fluidized bed technique, described at length in U.S. 3,240,744, is preferably carried out employing very finely-divided powders as are prepared by the present process.

The improved properties of the polymers processed in accordance with this invention are demonstrated by the following examples wherein the freeze drying operations are carried out in the Stokes Model 6P Freeze Dryer (Product of Stokes Division, Pennwalt Corporation), in which the PVDF latex or coagula is charged into trays in contact with the cold (−20° C.) shelves of the freeze dryer. After the charge is completely frozen, the drying chamber is evacuated by a mechanical vacuum pump, and the shelves are warmed to sublime the ice and dry the polymer.

EXAMPLE I

A dispersion of polyvinylidene fluoride (solids content about 30%), prepared by emulsion polymerization, was frozen by contact with the metal trays, and the polymer solids recovered by vacuum sublimation of the water in the freeze dryer. A second sample was recovered by coagulation, washing of the coagulum, and drying the wet coagulum in warm air. Micromerograph particle-size analysis of the two products, each containing less than about 0.1% moisture, gave the following results:

| Recovery technique | Particle size distribution of PVDF powder | | | |
|---|---|---|---|---|
| | D (μ) 50% avg. diam. | Percent greater than 10μ. | Percent greater than 20μ. | Percent greater than 30μ. |
| Contact freezing and freeze-dried. | 4.6 | 20 | 3.5 | 1.5 |
| Air-dried | 5.9 | 39 | 31 | 27 |

Separate coating dispersions were prepared by stirring thirty grams of each of the powders described above into 40 grams of carbitol acetate containing 5 grams of "Acryloid B44" (a 40% solution of thermoplastic acrylic resin in toluene, a product of Rohm & Haas Company) for 5 minutes with a high-speed, serrated-disc mixer. The dispersion prepared from freeze-dried polyvinylidene fluoride had a Hegman value of 5–4½, while that prepared from air-dried material had a Hegman of 1–0.

EXAMPLE II

A dispersion of polyvinylidene fluoride (solids content about 30%), prepared by emulsion polymerization, was frozen by delivering it drop-wise into liquid nitrogen, and the water was removed from the frozen solid by sublimation of the water in a vacuum in the freeze dryer. A second sample was prepared by air-drying a coagulum of the latex. Micromerograph particle-size analysis of the two products gave the following results.

| Recovery technique | Particle size distribution of PVDF powder | | | |
|---|---|---|---|---|
| | D (μ) 50% avg. diam. | Percent greater than 10μ. | Percent greater than 20μ. | Percent greater than 30μ |
| Frozen in liquid nitrogen and freeze-dried. | 5.0 | 9.4 | <1 | <1 |
| Air-dried | 5.9 | 39 | 31 | 27 |

Each of the products described above was stirred into a mixture of carbitol acetate and "Acryloid B44" acrylate ester polymer for 5 minutes with a high-speed, serrated-disc mixer in the proportions as described in Example 1. The dispersion of the freeze-dried polyvinylidene fluoride prepared in this way had a Hegman value over 6. The dispersion prepared from air-dried polyvinylidene fluoride had a Hegman value below 1.

I claim:
1. A process for preparing vinylidene fluoride polymer powder having improved properties in dispersion coating formulations which comprises freeze drying aqueous vinylidene fluoride polymer latex resin solids to separate the water from the resin, said vinylidene fluoride polymer being selected from the class consisting of normally solid vinylidene fluoride homopolymer and normally solid copolymers of vinylidene fluoride with up to about 30 mole percent of comonomer selected from the group consisting of hexafluoropropene, 1-chloro-1-fluoroethylene, trifluorochloroethylene, trifluoroethylene and tetrafluoroethylene.

2. A process according to claim 1 wherein the freeze drying is performed on the wet coagula of said latex.

3. A process according to claim 1 wherein the freeze drying is performed on uncoagulated latex.

References Cited

UNITED STATES PATENTS 3,464,964   9/1969   Black ............ 260—92.1 S
3,692,759   9/1972   Ocone ........... 260—92.1 S HARRY WONG, JR., Primary Examiner U.S. Cl. X.R.

260—29.6 F, 92.1 S